C. R. HOLDEN.
RAILWAY ROAD BED CONSTRUCTION.
APPLICATION FILED MAY 17, 1909. RENEWED FEB. 2, 1910.
968,155.
Patented Aug. 23, 1910.
5 SHEETS—SHEET 1.
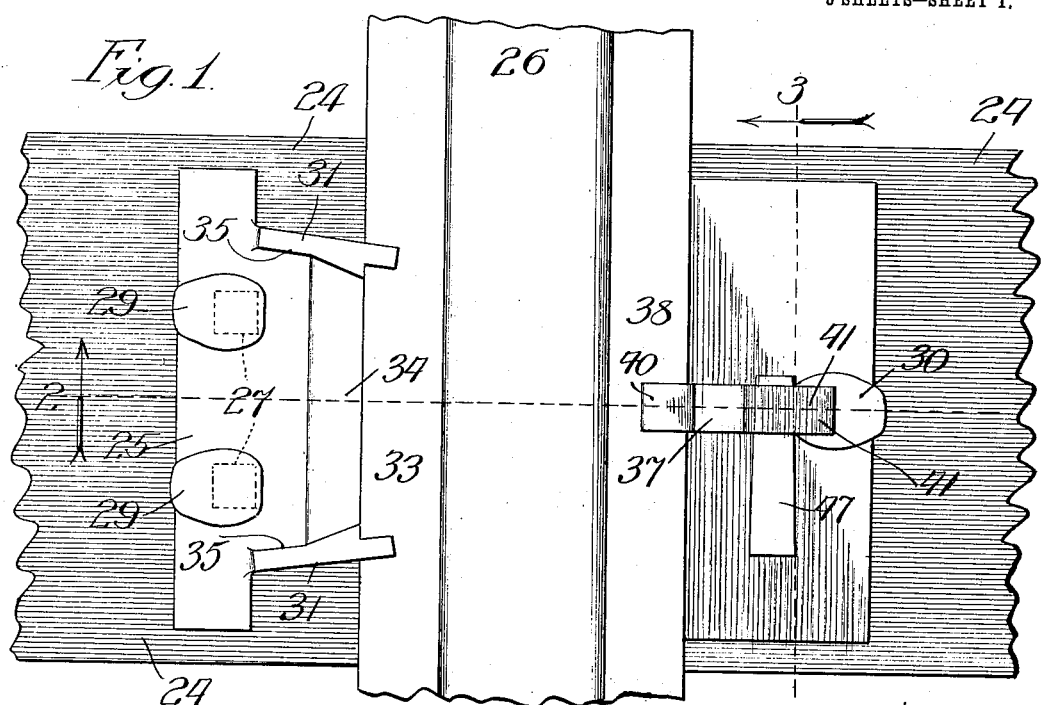
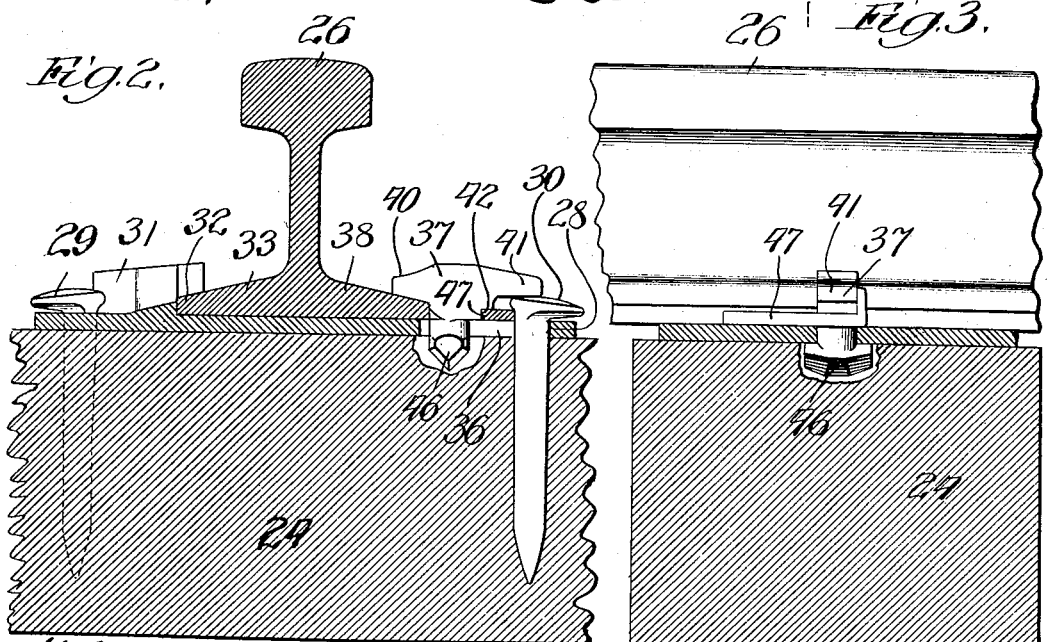
Witnesses:
John Enders
Chas. H. Bull
Inventor:
Charles R. Holden,
By Dyrenforth, Lee, Chritton & Wiles,
Attys.

C. R. HOLDEN.
RAILWAY ROAD BED CONSTRUCTION.
APPLICATION FILED MAY 17, 1909. RENEWED FEB. 2, 1910.
968,155.
Patented Aug. 23, 1910.
5 SHEETS—SHEET 2.
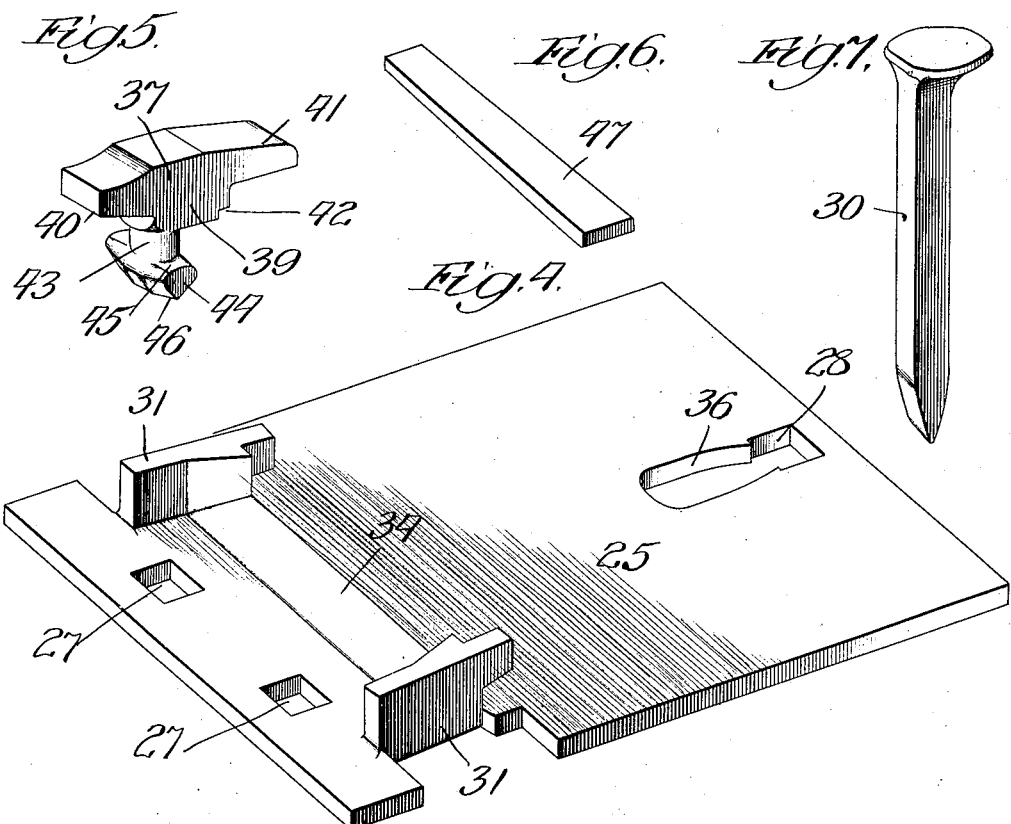
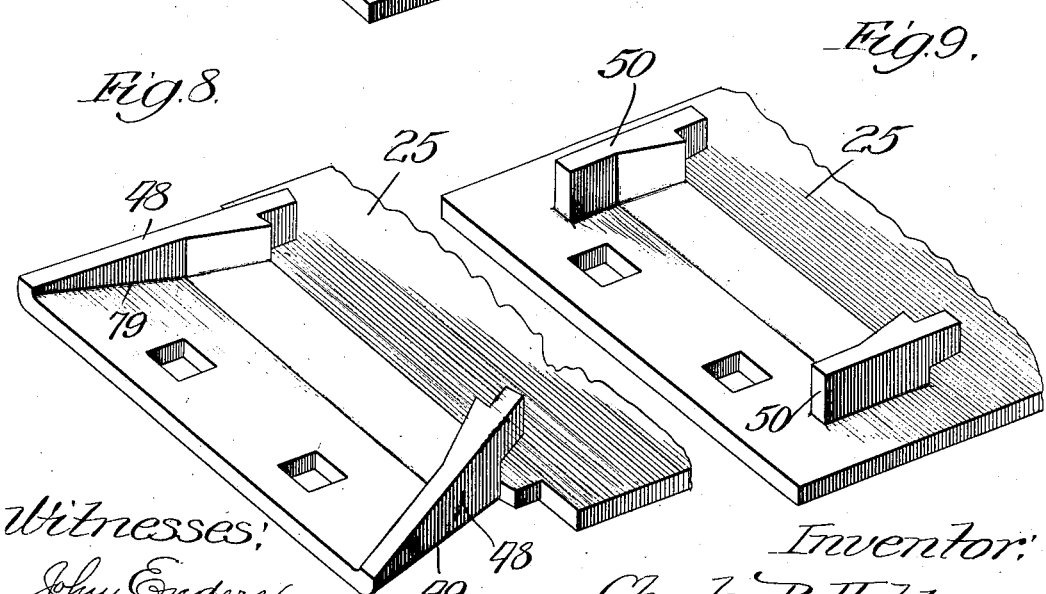
Witnesses:
John Enders
Chas. H. Bull
Inventor:
Charles R. Holden,
By Dyrenforth, Lee, Chritton & Wiles
Attys.

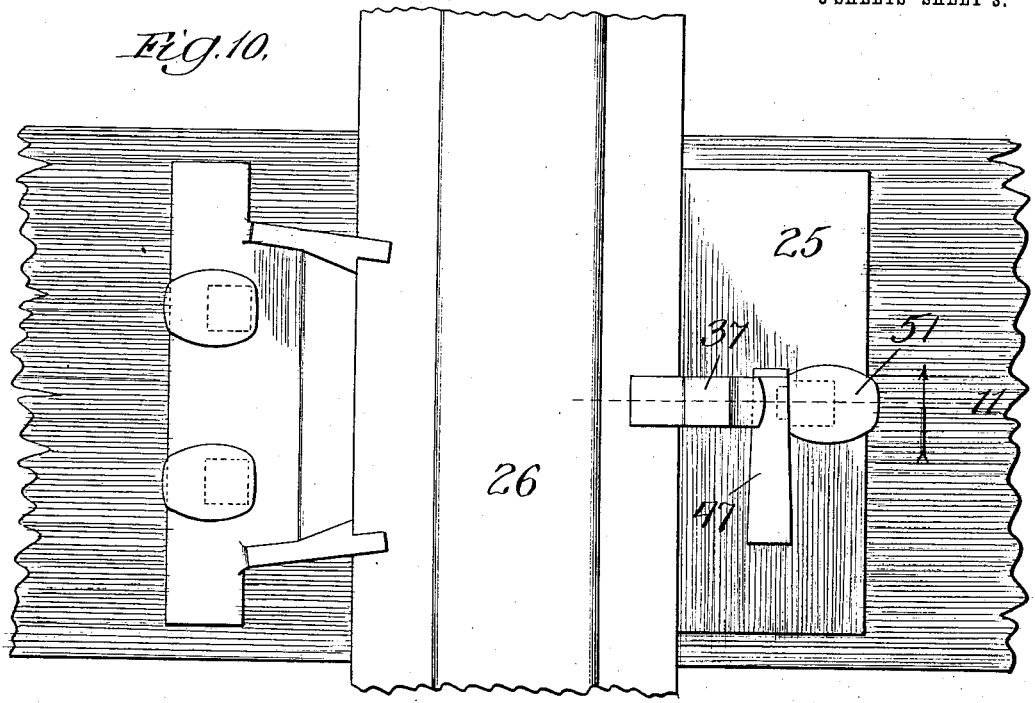
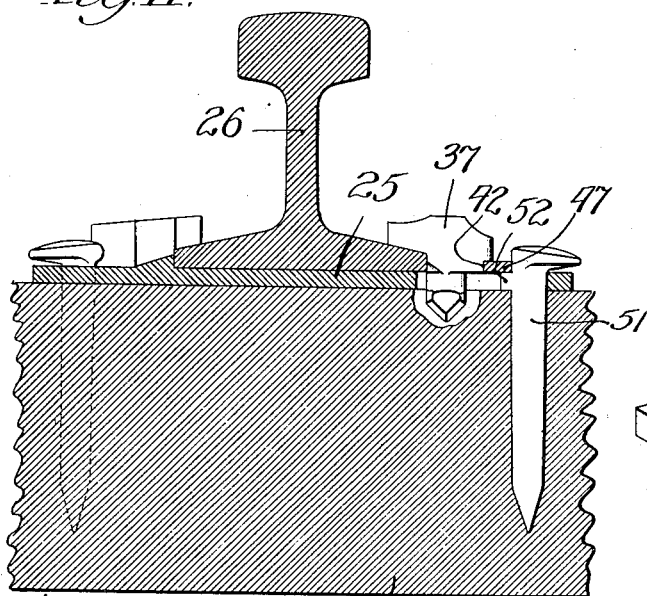
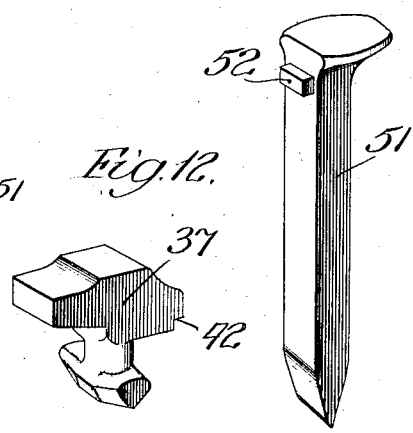

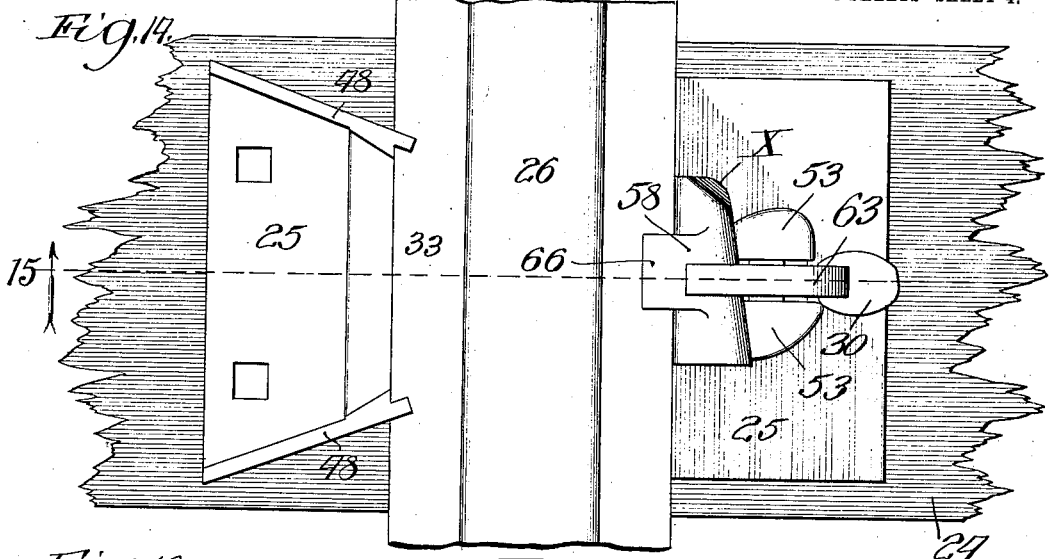
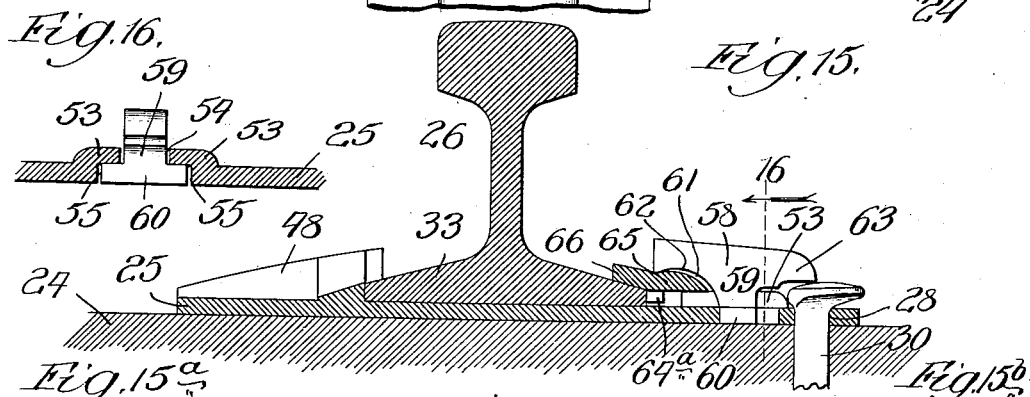
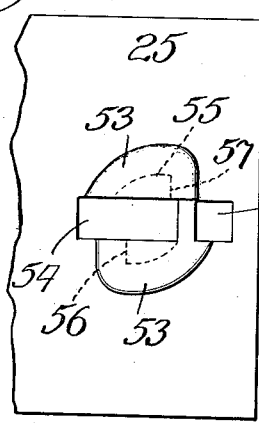
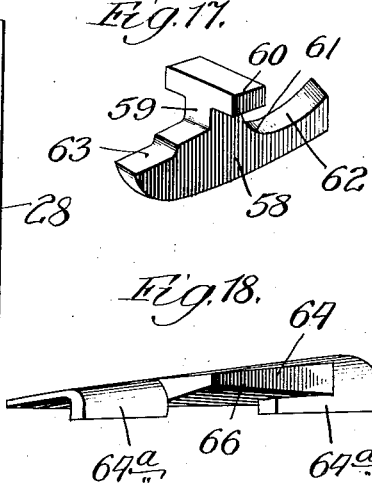
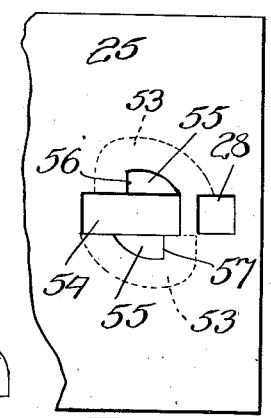

C. R. HOLDEN.
RAILWAY ROAD BED CONSTRUCTION.
APPLICATION FILED MAY 17, 1909. RENEWED FEB. 2, 1910.
968,155.
Patented Aug. 23, 1910.
5 SHEETS—SHEET 5.
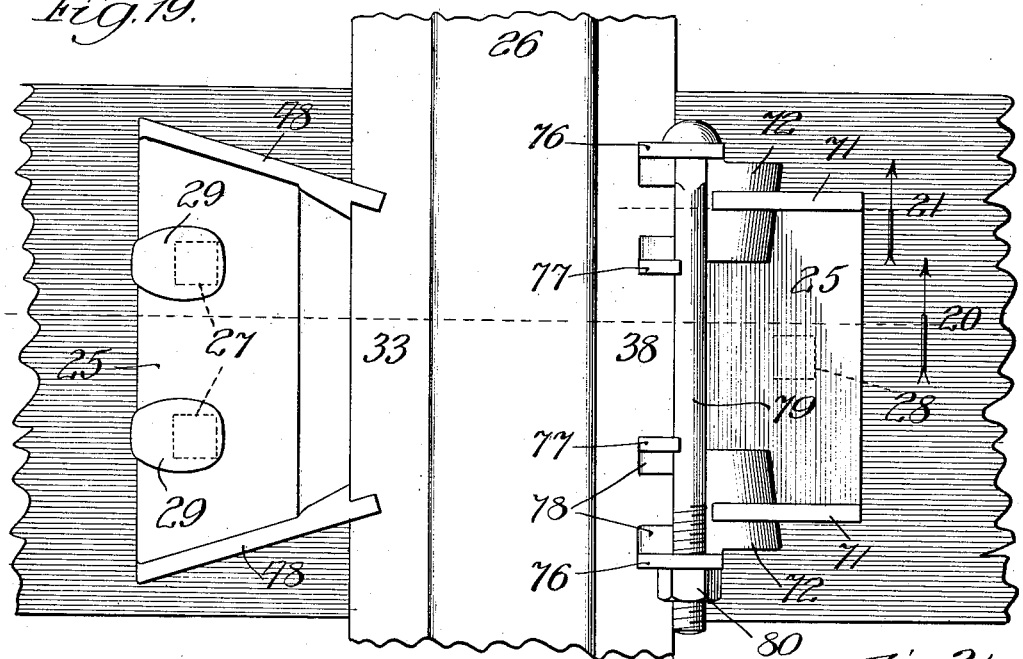
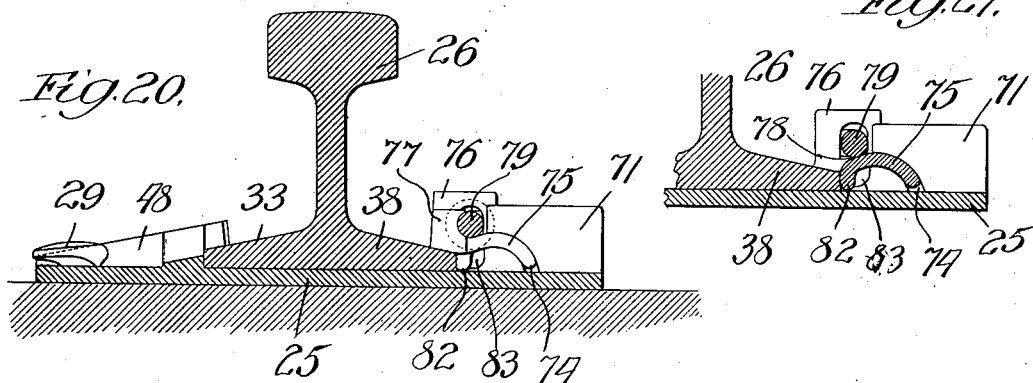
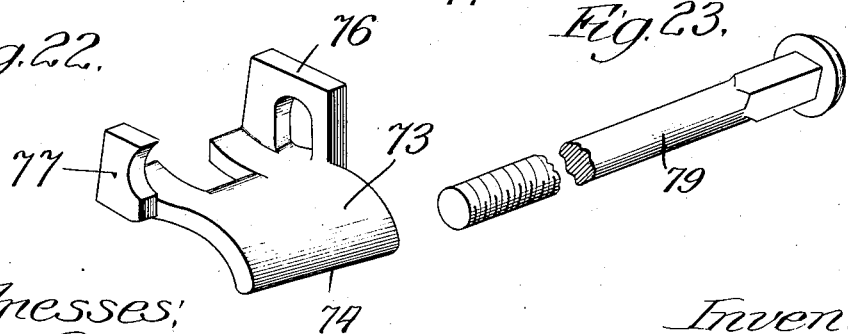
Witnesses:
John Enders
Chas. H. Buell.
Inventor:
Charles R. Holden,
By Dyrenforth, Lee, Chritton & Wiles,
Attys.

UNITED STATES PATENT OFFICE.

CHARLES R. HOLDEN, OF CHICAGO, ILLINOIS.

RAILWAY-ROAD-BED CONSTRUCTION.

968,155.      Specification of Letters Patent.      Patented Aug. 23, 1910.

Application filed May 17, 1909, Serial No. 496,584. Renewed February 2, 1910. Serial No. 541,601.

*To all whom it may concern:*

Be it known that I, CHARLES R. HOLDEN, a citizen of the United States, residing at Chicago, in the county of Cook and State of Illinois, have invented a new and useful Improvement in Railway-Road-Bed Construction, of which the following is a specification.

My invention relates, more particularly, to improvements in ties of wood or other material of a character adapting them to receive spikes provided with metal plates secured thereto toward their opposite ends and forming seats for rails secured to the plates, my primary object being to provide a construction of the character above referred to which, in use, will not present the disadvantage of loosening of the plates on the tie-proper, other objects being to provide a simple construction of plate having abutments so formed integrally therewith as to not impair the stability of the tie-structure, and to provide means, coöperating with the means for holding the rails to the ties, for engaging with the spikes holding the plates to the ties to positively prevent accidental displacement of the spikes.

Referring to the accompanying drawings—Figure 1 is a plan view of one end of a tie of wood or other like material showing a plate spiked thereto and carrying a rail, the securing means for which engage with one of the spikes, this construction being one of the forms in which my invention may be embodied. Fig. 2 is a section taken at the line 2 on Fig. 1 and viewed in the direction of the arrow, this view being of reduced size. Fig. 3 is a section taken at the line 3 on Fig. 1 and viewed in the direction of the arrow. Fig. 4 is a perspective view of the rail-supporting plate illustrated in Fig. 1. Fig. 5 is a perspective view of the construction of removable and replaceable rail-flange-engaging clip illustrated in Fig. 1. Fig. 6 is a perspective view of a wedge-bar for forcing the clip shown in Fig. 5 toward and into engagement with the rail. Fig. 7 is a perspective view of the ordinary spike which may be employed in connection with the plate and rail-fastening means of Fig. 1. Fig. 8 is a perspective view of one end of a modification of plate, the end shown representing another form in which the abutments integral with the plate may be provided. Fig. 9 is a view like that of Fig. 8 showing another modification of the plate of Fig. 4. Fig. 10 is a view like that of Fig. 1 showing a modified construction of spike and the means coöperating therewith for holding it in place in the tie. Fig. 11 is a section taken at the line 11 on Fig. 10 and viewed in the direction of the arrow, this view being reduced in size. Fig. 12 is a perspective view of the rail-fastening clip illustrated in Fig. 11. Fig. 13 is a perspective view of the form of spike employed in the construction illustrated in Fig. 11 for holding the plate to the tie adjacent to this clip. Fig. 14 is a plan view of one end of a tie of wood, or like material, with a plate like that shown at 25 in Fig. 8 secured thereon, this view showing how the spike-retaining feature of my invention may be embodied in a form of removable and replaceable rail-engaging clip, different from those illustrated in the preceding figures. Fig. 15 is a section taken at the line 15 on Fig. 14 and viewed in the direction of the arrow. Fig. 15$^{a}$ is a top plan view of one end-portion of the plate shown on Fig. 14. Fig. 15$^{b}$ is a bottom plan view of the same. Fig. 16 is a section taken at the line 16 on Fig. 15 and viewed in the direction of the arrow. Fig. 17 is a perspective view of the key-engaging clip illustrated in Fig. 15, the clip being shown in inverted position. Fig. 18 is a perspective view of the rail-flange-engaging key shown in Fig. 15. Fig. 19 is a broken plan view of a tie of wood, or like material, with a plate secured thereon, this view showing another modification of the tie-plate of Fig. 1 in which the abutments for the opposite sides of the rail are formed integrally with the plate for coöperating with a plurality of rail-flange-engaging clips for one side of the rail. Fig. 20 is a section taken at the line 20 on Fig. 19 and viewed in the direction of the arrow. Fig. 21 is a broken section taken at the line 21 on Fig. 20 and viewed in the direction of the arrow, this view showing one of the rail-flange-engaging clips in section. Fig. 22 is a perspective view of one of the two similar rail-flange-engaging clips forming a part of the structure illustrated in Fig. 19; and Fig. 23, a similar view of the bolt-device employed for holding the clips of Fig. 19 in position on the tie-plate.

In each of the illustrations in the drawings I have shown but one tie-plate secured to a tie with a rail fastened to the plate, though it will be understood that in practice two tie-plates and the fastening means hereinafter described will be provided for each tie toward its opposite ends.

Referring to Figs. 1 to 9 inclusive, one end portion of a tie of wood, or any other suitable material of a character adapted to receive a spike is represented at 24. The tie is shown as supporting at its upper side a plate 25, of metal, which is considerably longer than the width of the rail supported thereon and represented at 26, this plate containing in its opposite end-portions, beyond the sides of the rail, spike-holes 27 and 28, respectively, through which spikes 29 and 30, of the form commonly employed, are driven for fastening the plate 25 to the tie. The plate toward the end containing the openings 27 carries at its edge-portions upwardly extending lugs 31 provided with undercut portions 32 into which the outer flange 33 of the rail 26 is adapted to extend, these lugs forming abutments for one side of the rail which coöperates with a rib 34 located on the tie between these lugs in a position to be engaged by the rail-flange 33. The lugs 31 in this plate-construction are formed from the edge-portions of the plate 25 by partially severing the metal of these portions between the ends of the plates and then bending up such partially severed portions to cause them to extend at right angles to the body of the plate, it being preferred that the bending lines, and thus the base-portions of the lugs 31 of the partially severed portions of the plate, extend obliquely with relation to the edges of the latter, and converge toward the median line of the plate, as represented at 35, the object of so forming the clips as to cause their base-portions to extend obliquely being hereinafter set forth. The plate 25 toward the end containing the spike-hole 28 contains an elongated slot 36 which communicates with the hole 28, the latter and the slot 36 being preferably located midway between the lateral edges of the plate containing them. The slot 36 is provided for the purpose of receiving a removable and replaceable rail-flange-engaging clip 37 for engaging with the flange 38 of the rail 26 opposite to that which engages with the abutments 31, it being preferred that these abutments engage with the outer flange of the rail and that the clip 37 engage with the inner flange thereof. The clip illustrated comprises a body-portion 39 provided with a rail-flange-engaging shoulder 40, a rearwardly-extending lug 41, an undercut portion 42 adjacent to the lug 41, a depending shank 43, circular in cross-section, and a cross-piece 44 formed with a curved upper surface 45 and extending at a right angle to the body-portion of the plate, the lower portion of this cross-piece being of wedge-shape as illustrated at 46.

To fasten the rail 26 to the plate, assuming the rail to be seated thereon and extending into engagement with the abutments 31, the clip 37 is first inserted at its cross-piece 44 through the slot 36 and then driven into the tie 24 sufficiently far to cause it to extend below the plane of the under side of the plate 24. The clip is then partially rotated to cause its shoulder 40 to extend over the rail-flange 38, in which position the lug 41 will bear against the head of the spike 28, all as clearly illustrated in Figs. 1 and 2. A wedge-bar, such as for instance the one represented at 47, is then wedged between the undercut portion 42 of the clip and the head of the spike 30, thereby causing the clip to be forced toward the rail and its shoulder 40 to be turned down and against the rail-flange 38, the clip being given this tipping action owing to the fact that the wedge 47 engages the clip at a point above the cross-piece 44.

It will be noted from the drawings and the foregoing description thereof, that the spikes 29 and 30 are provided for the purpose only of holding the plate to the tie, and that means separate therefrom are employed for fastening the rail to the plate. Furthermore, the spikes engage the plate beyond the abutments 31 and clip 37 and thus the leverage exerted against the spikes tending to withdraw them from the tie when a train is passing over a track, is reduced to such an extent as compared with constructions wherein the spikes directly engage the rail, that danger of withdrawal of the spikes is reduced to the minimum. Danger of impairment to the roadbed from the above-stated cause is further prevented by the provision of the lip 41 on the clip 37 for bearing against the top of the adjacent spike.

The object of so forming the abutments 31 as to cause their bases to extend obliquely with relation to the sides of the plates carrying them is to enable the abutments to be formed integrally from the plate at its sides, without impairing the stability and supporting strength of the tie-structure.

The construction of tie-plate illustrated in Fig. 8 differs from the plate represented in Fig. 1 with regard to its fixed abutments for the rail. Instead of forming abutments 31 between the ends of the plate as described, abutments 48 are formed from corners of the plate 25 and bent along lines oblique to the sides of the plate as represented at 49, these abutments extending to the extreme end of the plate. It will thus be seen that the feature of advantage recited of the abutments 31, by reason of having their base walls extend obliquely with relation to the sides of the plate, is also afforded by the construction illustrated in Fig. 8.

If desired, the plate 25 may be provided in a form permitting the full seating area of the plate to be retained, as for instance by forming permanent abutments for the rail on the plate, by the well-known rolling process, the form of abutments preferred being those illustrated at 50.

The construction illustrated in Figs. 10 to 13, inclusive, necessitates the use of a special form of spike for the end of a plate adjacent to the removable clip for the rail. In this construction the lug 41 on the clip 37 is dispensed with and as a substitute therefor I provide a special form of spike 51, equipped with a rib 52, the upper surface of which, when the spike is driven into the tie for holding the plate to it, extends flush with the upper surface of the plate 25. The wedge-bar 47 in this construction is adapted to be wedged between the undercut portion 42 of the clip 37 and the head of the spike 51 above the rib 52. The operation of securing the rail to the plate is the same as that described of the construction shown in the preceding figures, the only difference being that instead of the clip 37 engaging directly with the adjacent spike for holding it against withdrawal from the tie, it engages indirectly therewith through the medium of the wedge-bar 47 bearing against the rib 52.

In Figs. 14 to 18 inclusive, I have illustrated another embodiment of my invention. In this construction the plate 25 affords abutments 48 like those described of the construction in Fig. 8, these abutments serving to engage with the outer flange 33 of the rail 26, the construction illustrated in Figs. 14 to 18 inclusive differing from those already described in the form of means for engaging with the flange of the rail opposed to that engaging the abutments, for holding the rail to the tie. The plate 25 is provided with spaced struck-up portions 53 disposed at one side and intermediate the spike-opening 28 with a slot 54 in the plate between the portions 53. By forming the portions 53, recesses 55 are provided on the under side of the plate at opposite sides of the slot 54 affording oppositely disposed shoulders 56 and 57 flanking the slot 54. A removable and replaceable abutment device represented at 58 is adapted to be inserted into the slot 54 to interlock with the plate 25 and adjacent spike 30. To permit this to be done, I form the device 58 with a depending shank 59 terminating in a transversely-disposed cross-piece 60, an undercut portion 61 having a curved surface 62 and a rearwardly-extending lip 63. To position the device 58 on the plate, the cross-piece 60 is inserted through the slot 54 and then rotated therein to cause the ends of the cross-piece 60 to extend into the recesses 55 and abut against the shoulders 56 and 57 and the lip 63 to bear against the spike 30. The abutment-device 58 thus positioned on the plate 25 serves as an abutment for a rail-flange-engaging key, such as that represented at 64. The key illustrated comprises a body-portion 65 of curved shape in cross-section tapering in size throughout its length and of gradually decreasing thickness from its larger toward its smaller end as represented, a laterally-disposed rail-flange-engaging shoulder 66 adapted to bear against the adjacent flange of the rail and bearing lugs 64ª at opposite sides of the shoulder 66. It is intended that this key be inserted at its small end into the undercut portion 61 of the device 58, to cause its curved outer wall to bear against the curved surface 62 and its shoulder 66 against the rail-flange. The key 65 may then be forced transversely of the plate into tight engagement with the abutment 58 and rail-flange 38, the rail-flange-engaging portion 66 of the key, in this movement, being turned down and against the rail-flange 38. The key may be secured against accidental displacement by bending down its comparatively thin small end over the edge of the adjacent one of the struck-up portions 53, as indicated at X. With the parts in the position described for holding a rail in place, the lip 63 bears against the head of the spike 30 and thus any tendency of the spike to be withdrawn by the action of a train passing over the track is avoided.

In Figs. 19 to 23 inclusive, I have shown still another embodiment of my invention. The tie-plate 25 of this construction is formed with abutments 48 like those represented in Fig. 8 for the flange 33 of the rail 26, with the spike-holes 27 and 28 formed in the plate adjacent to its extremities, but instead of providing the opening 36 for receiving a removable and replaceable clip such as that represented at 37, abutments 71 are provided for the purpose of coöperating with wedge-clips 72 engaging with the flange 38 of the rail. The wedge-clips 72 are of curved shape in cross-section and tapered at their sides and edges from end to end as represented at 73 and 74, respectively, it being designed that these clips be inserted into curved slots 75 formed in the abutments 71, from opposite sides of the plate to position them as represented in Fig. 19. Each of the clips 72 carries toward its outer end an apertured lug 76, at its inner end an abutment-lug 77, and between these lugs lateral rail-flange-engaging portions 78 and depending lugs 82 and 83. It is designed that these clips be applied to the abutments 71 as described and then forced toward each other to cause their tapering surface 73 and 74 to move against the curved walls of the recesses 75 and the top surface of the plate 25, respectively, to turn these clips in the recesses 75 and thus force the portions 78, 82 and 83 thereof into engagement with the rail-flange 38. The means which I prefer to employ for so operating the clips 72 comprise a bolt 79 which extends through the apertures in the lugs 76 and bears at its headed end against the adjacent one of the lugs 76, the bolt at its screw-threaded end carying a nut 80 adapted to be screwed against the other of the lugs 76, whereby the clips 72 may be forced toward each other for performing the rail-securing function.

The construction shown in Figs. 1 to 9, wherein the aperture 36 communicates with the aperture 28, is preferred, but where comparatively thin plates are used, in order to stiffen the sides of the aperture 36 to sustain the strain thereon of the lugs 44 of the clip 37, a strip of metal 53 is interposed between said apertures as in Fig. 15.

It will be noted that in so far as the feature of providing means for securing the rails to the plates is concerned, the particular form of rail-securing means is immaterial, so long as the above recited feature is preserved. It will also be noted that the feature of providing means associated with the rail-securing means for engaging with a spike of the plate is not limited in its embodiment to the particular ways illustrated and described.

As hereinbefore stated, this invention relates not only to ties formed of wood, but of every other material into which a spike may be driven and held in position against accidental withdrawal, and therefore by referring in the claims to wooden ties I do not wish to be understood as limiting my invention to its use in connection with ties formed of wood, as it is applicable to ties formed of any other suitable material having the properties which render ties formed of wood desirable.

What I claim as new and desire to secure by Letters Patent is—

1. A metal tie-plate for ties of the character set forth containing openings adapted to receive means for fastening the plate to a tie, said openings being spaced sufficiently far apart to cause said means, when in position in the plate and tie, to be out of engagement with the rail seated thereon, and abutments for a side of a rail formed integrally with said plate, said abutments being non-coincident with the parts of the plate containing said openings, said plate having an opening adapted to receive and retain means for engaging the other side of the rail and containing a second opening adjacent to said last referred to opening adapted to receive a removable wedge-engaging abutment, for the purpose set forth.

2. In combination with a tie of wood or other material suitable to retain spikes, a metal tie-plate seated thereon and containing openings, means extending through said openings for securing the plate to the tie, said openings being spaced sufficiently far apart to cause said means, when in position on the plate and tie, to be out of engagement with a rail seated thereon, abutments for one side of a rail formed integrally with said plate out of coincidence with the parts of said plates containing said openings, means for engaging the opposite side of the rail extending through an opening in the plate and so constructed as to be maintained in position on the plate, a removable abutment fitting in an opening in the plate beyond said rail-securing means, and wedging-means operating against said abutment and said rail-securing means, for the purpose set forth.

3. In combination with a tie of wood, or other material suitable to receive spikes, a metal tie-plate containing openings at which it is adapted to be secured to the tie by spikes, said openings being spaced sufficiently far apart to cause said spikes to be out of engagement with the rail, abutments for a side of a rail formed integrally with said plate and non-coincident with said openings, means for engaging the other side of a rail extending into an opening in the plate and constructed and arranged to be held on the plate against displacement, and wedging-means operating against said rail-securing means and the adjacent one of the spikes for holding the plate to the tie.

4. A metal tie-plate containing openings adapted to receive means for fastening the plate to a tie, said openings being spaced sufficiently far apart to cause said means, when in position in the plate and tie, to be out of engagement with a rail seated thereon, and abutments on the plate for one side of a rail formed by bending up the metal of its opposed edge-portions, said abutments being non-coincident with the parts of the plate containing said openings, said plate containing an opening adapted to receive and retain means engaging in said opening for engaging the opposite side of the rail, and also containing another opening adapted to receive a removable and replaceable wedge-engaging abutment, for the purpose set forth.

5. A metal tie-plate having abutments for a side of the rail formed from metal of the opposite edge-portions of the plate, and extending obliquely with relation to the sides of the plate, for the purpose set forth.

6. A metal tie-plate having abutments for a side of the rail formed from metal of the opposite edge-portions of the plate and converging toward the median line of the plate and extending obliquely with relation to the edges thereof, for the purpose set forth.

7. A metal tie-plate carrying undercut abutments for a flange of a rail, formed of metal forming opposite edge-portions of the plate, and extending obliquely with relation to the edges of the plate, and a rib formed on the plate between said abutments and in line with their undercut portions.

8. In a railway-roadbed construction, the combination of a tie of wood, or other material suitable for receiving spikes, a metal plate spiked thereto, a rail supported on the plate, and means on the plate for fastening the rail thereto constructed and arranged to engage with the adjacent spike to prevent its accidental withdrawal from the tie.

9. In a railway-roadbed construction, the combination of a tie of wood, or other material suitable for receiving spikes, a metal plate spiked thereto, a rail supported on the plate, abutments on the plate for one side of the rail, and a clip-device on the plate constructed and arranged to engage with the rail and with the adjacent spike for holding the rail to the plate and preventing the spike from being accidentally withdrawn from the tie.

10. In a railway-roadbed construction, the combination of a tie of wood, or other material suitable for receiving spikes, a metal plate spiked thereto and carrying means for engaging with one flange of a rail, and a clip engaging with the other flange of the rail for holding it to the plate, said last-named clip being provided with a lip adapted to bear against the head of the adjacent spike for preventing accidental withdrawal of this spike from the tie.

11. In a railway-roadbed construction, the combination of a tie of wood, or other material suitable for receiving spikes, a metal plate spiked thereto and provided near one end with abutments for one flange of a rail, and containing near its opposite end a slot adjacent to one of the spikes, a removable and replaceable clip for the opposite flange of the rail adapted to be inserted into said slot and engage with the adjacent flange of the rail and the adjacent spike, and interlock with the plate, and means for holding said clip in rail-securing position.

12. In a railway-roadbed construction, the combination of a tie of wood, or other material suitable for receiving spikes, a metal plate provided toward its opposite ends with holes at which the plate is spiked to the tie, undercut abutments on the plate for one side of a rail, said plate containing a slot toward its opposite end, a rail seated on said plate in engagement with said abutments, a removable and replaceable clip extending through the slot in the plate and interlocking with the latter, said clip having a rail-flange-engaging shoulder at which it engages with a side of the rail, and a lip bearing against the top of the adjacent spike, and a wedge-bar adapted to be wedged between said clip and the spike adjacent thereto for moving the clip into rigid engagement with the rail.

CHARLES R. HOLDEN.

In presence of—
RALPH A. SCHAEFER,
JOHN WILSON.